US008782178B2

(12) United States Patent
Rosenberg (10) Patent No.: US 8,782,178 B2
(45) Date of Patent: Jul. 15, 2014

(54) DISTRIBUTED BOOTSTRAPPING MECHANISM FOR PEER-TO-PEER NETWORKS

(75) Inventor: Jonathan Rosenberg, Freehold, NJ (US)

(73) Assignee: Cisco Technology, Inc., San Jose, CA (US)

(*) Notice: Subject to any disclaimer, the term of this patent is extended or adjusted under 35 U.S.C. 154(b) by 1650 days.

(21) Appl. No.: 11/762,937

(22) Filed: Jun. 14, 2007

(65) Prior Publication Data
US 2008/0313450 A1    Dec. 18, 2008

(51) Int. Cl.
*G06F 15/177* (2006.01)
*H04L 29/12* (2006.01)
*H04L 12/56* (2006.01)
*H04L 29/08* (2006.01)
*G06F 9/44* (2006.01)

(52) U.S. Cl.
CPC ..... *H04L 29/12235* (2013.01); *H04L 29/12113* (2013.01); *H04L 45/02* (2013.01); *H04L 61/2023* (2013.01); *H04L 61/2007* (2013.01); *H04L 61/25* (2013.01); *H04L 67/1046* (2013.01); *H04L 67/1063* (2013.01); *H04L 67/1065* (2013.01); *G06F 9/4416* (2013.01); *G06F 15/177* (2013.01)
USPC ........... 709/220; 709/217; 370/254; 370/328; 370/351

(58) Field of Classification Search
CPC ................... H04L 29/12113; H04L 29/12235; H04L 45/02; H04L 61/2023; H04L 61/2007; H04L 61/25; H04L 67/1046; H04L 67/1063; H04L 67/1065; G06F 9/4416; G06F 15/177
USPC ......... 709/205–206, 218, 226, 228, 249, 220, 709/217; 370/254, 328, 351
See application file for complete search history.

(56) References Cited

U.S. PATENT DOCUMENTS

| 5,835,723 A * | 11/1998 | Andrews et al. ............. 709/226 |
| 2003/0105865 A1 * | 6/2003 | McCanne et al. ............. 709/225 |
| 2004/0057443 A1 * | 3/2004 | Kim et al. ..................... 370/401 |
| 2004/0063402 A1 * | 4/2004 | Takeda et al. ................ 455/41.1 |

(Continued)

OTHER PUBLICATIONS

Cheng et al., An Anycast-based P2P Routing Protocol for Mobile Ad Hoc Networks, In IEEE/IFIP ICI, 2005, 5 pages.*

(Continued)

*Primary Examiner* — Oleg Survillo
(74) *Attorney, Agent, or Firm* — Baker Botts L.L.P.

(57) ABSTRACT

Methods, apparatuses and systems directed to a distributed bootstrapping mechanism for peer-to-peer networks. In particular implementations, the de-centralized bootstrapping mechanism utilizes an allocated set of anycast addresses from the public IP space. Routing nodes or peer nodes corresponding to respective autonomous systems select an anycast address by computing a hash of an Autonomous System (AS) number (or other string) and mapping the hash value, or a portion of the hash value, to one of the anycast addresses in the allocated set. Other mechanisms for selecting anycast addresses (such as random selection) can be used. One or more of the routing nodes of the autonomous system may advertise a host route identifying the selected anycast address. When a new peer node is added to the P2P network, it may, upon initialization, transmit discovery messages using the anycast addresses from the allocated set, which may be ultimately routed to one of the peers in the P2P network. One of the responding peers in the P2P network may then be used by the newly initialized peer as a bootstrap resource to join the P2P network.

12 Claims, 5 Drawing Sheets

(56) References Cited

U.S. PATENT DOCUMENTS

| | | |
|---|---|---|
| 2004/0085912 A1* | 5/2004 | Xu et al. .................... 370/254 |
| 2004/0202183 A1* | 10/2004 | Thubert et al. ........... 370/395.31 |
| 2006/0209885 A1* | 9/2006 | Hain et al. .................. 370/465 |
| 2006/0242227 A1* | 10/2006 | Rao et al. .................... 709/203 |
| 2007/0070959 A1* | 3/2007 | Almeroth et al. ............. 370/338 |
| 2007/0097885 A1* | 5/2007 | Traversat et al. ............. 370/254 |
| 2007/0189249 A1* | 8/2007 | Gurevich et al. ............. 370/338 |
| 2007/0237159 A1* | 10/2007 | Yamada et al. ........... 370/395.53 |
| 2008/0137638 A1* | 6/2008 | Chun .......................... 370/351 |
| 2008/0253306 A1* | 10/2008 | Manion et al. ............... 370/255 |
| 2008/0279222 A1* | 11/2008 | Fuller et al. ................. 370/501 |

OTHER PUBLICATIONS

Caesar et al., ROFL: Routing on Flat Labels, SIGCOMM'06, Sep. 15, 2006, pp. 363-374.*

Johnson, et al.; RFC 3775: Mobility Support in IPv6; Jun. 2004; Network Working Group; 143 pages.*

Bryan, D., et al., "dSIP; A P2P Approach to SIP Registration and Resource Location", Internet-Draft, SIPeerior Technologies, Inc., Feb. 25, 2007.

* cited by examiner

DISTRIBUTED BOOTSTRAPPING MECHANISM FOR PEER-TO-PEER NETWORKS

TECHNICAL FIELD

This disclosure relates generally to peer-to-peer networks.

BACKGROUND

A peer-to-peer (or P2P) computer network relies primarily on the computing power and bandwidth of the participants or peers in the network rather than concentrating it in a relatively low number of servers. P2P networks are typically used for connecting nodes via largely ad hoc connections. P2P networks are overlay networks formed by a set of cooperating peers connected over a packet network, such as an Internet Protocol (IP) based network or the Internet. P2P networks are useful for many purposes. Sharing content files (see file sharing) containing audio, video, data or anything in digital format is very common, and realtime data, such as telephony traffic, is also passed using P2P technology.

A pure peer-to-peer network does not have the notion of clients or servers, but equal peer nodes that simultaneously function as both "clients" and "servers" to the other nodes on the network. This model of network arrangement differs from the client-server model where communication is usually to and from a central server. A typical example for a non peer-to-peer file transfer is an FTP server where the client and server programs are quite distinct, and the clients initiate the download/uploads and the servers react to and satisfy these requests.

Most P2P networks require minimal configuration of nodes for them to participate in the network. As a general node, a new node wishing to join needs to know the identity of any node on the P2P network in order to join it. To facilitate that, P2P networks require some form of bootstrapping to allow a peer, when it first comes online, to discover the identities of a few nodes within the P2P network. From there, the newly initialized peer can insert itself in the right place and no longer utilize the bootstrap nodes. Typically, a centralized client-server mechanism is utilized to allow a newly initialized peer to discover and obtain information from a bootstrap node. A centralized bootstrapping mechanism, however, does present certain administrative challenges as it requires some entity to support and maintain the bootstrapping mechanism.

DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

A. Overview of the Disclosure

The present invention provides methods, apparatuses and systems directed to a distributed bootstrapping mechanism for peer-to-peer networks. In particular implementations, the de-centralized bootstrapping mechanism utilizes an allocated set of anycast addresses from the public IP space. Routing nodes or peer nodes corresponding to respective autonomous systems select an anycast address by computing a hash of an Autonomous System (AS) number (or other string) and mapping the hash value, or a portion of the hash value, to one of the anycast addresses in the allocated set. Other mechanisms for selecting anycast addresses (such as random selection) can be used. One or more of the routing nodes of the autonomous system may advertise a host route identifying the selected anycast address. When a new peer node is added to the P2P network, it may, upon initialization, transmit discovery messages using the anycast addresses from the allocated set, which may be ultimately routed to one of the peers in the P2P network. One of the responding peers in the P2P network may then be used by the newly initialized peer as a bootstrap resource to join the P2P network.

A technical advantage provided by certain embodiments is that the bootstrapping mechanisms are fully distributed among the nodes in the peer-to-peer network, eliminating the need for centrally administered bootstrap servers or supercedes. Another technical advantage is that a given peer will generally tend to utilize the bootstrapping resource on the topologically closest peer in the P2P network, Certain embodiments of the invention may include none, some, or all of the above technical advantages. One or more other technical advantages may be readily apparent to one skilled in the art from the figures, descriptions, and claims included herein.

B. Example Network Architecture and Operation

Embodiments of the present invention and its advantages are best understood by referring to FIGS. 1 through 5 of the drawings, like numerals being used for like and corresponding parts of the various drawings.

Figure 1:
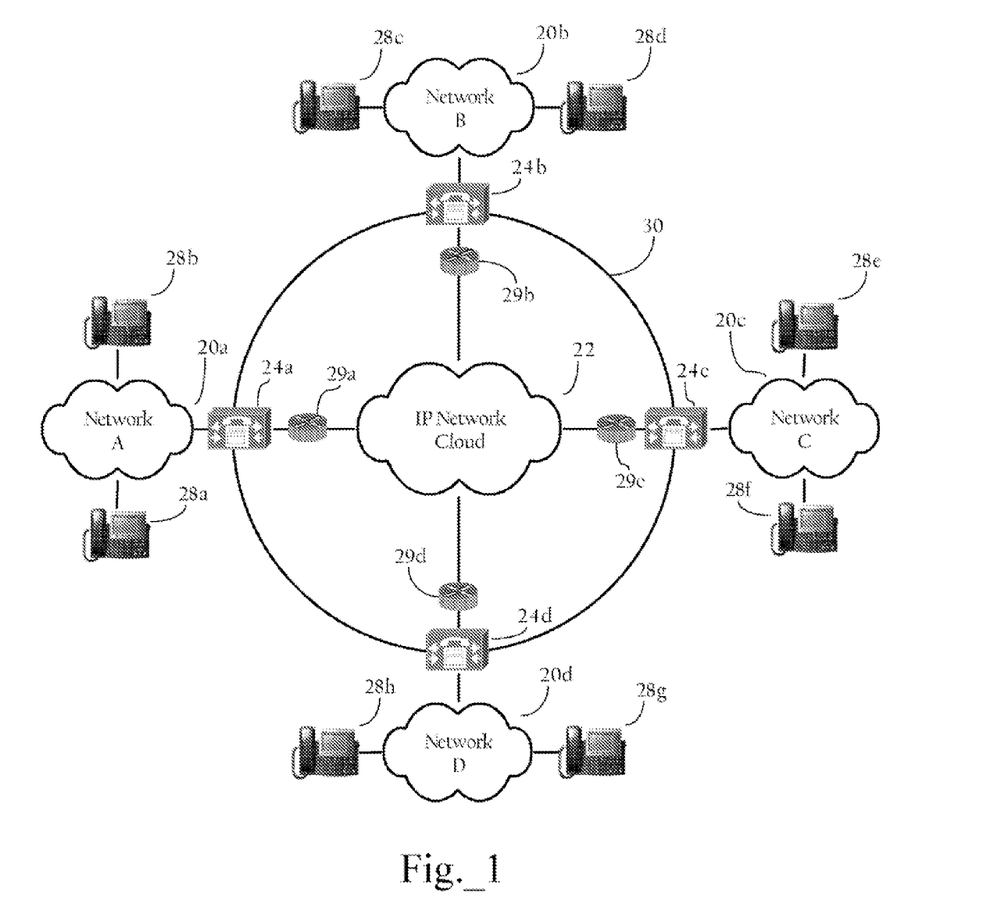
FIG. 1 is a block diagram of an example peer-to-peer network.

FIG. 1 is a functional diagram of an example peer-to-peer network 30 operating across an IP network 22. In the illustrated network, the peer nodes 24a-d are VoIP gateways or call managers that rely on P2P technologies to share VoIP call routing information. Embodiments of the present invention, however, can be used in a wide variety of P2P network types, such as file sharing networks, and the like. The peer nodes 24a-d can be other types of nodes, including but not limited to computers, IP connected peripherals, servers, software running on a PC. They can use the P2P network to distribute any kind of information, including but not limited to files, multimedia content, user profile information, phone number information, or any other arbitrary data. Border routers 29a-d operably connect nodes, such as peer nodes 24a-d and other hosts, connected to respective networks 20a-d to IP network 22. In the network shown in FIG. 1, hosts 28a-h are IP phones.; however, hosts 28a-h can be general purpose or special purpose computing systems. Hosts 28a-h may also be mobile nodes, such as a personal digital assistant, a computer such as a laptop, a cellular telephone, a mobile handset, or any other device operable to communicate over network 22.

Figure 5:
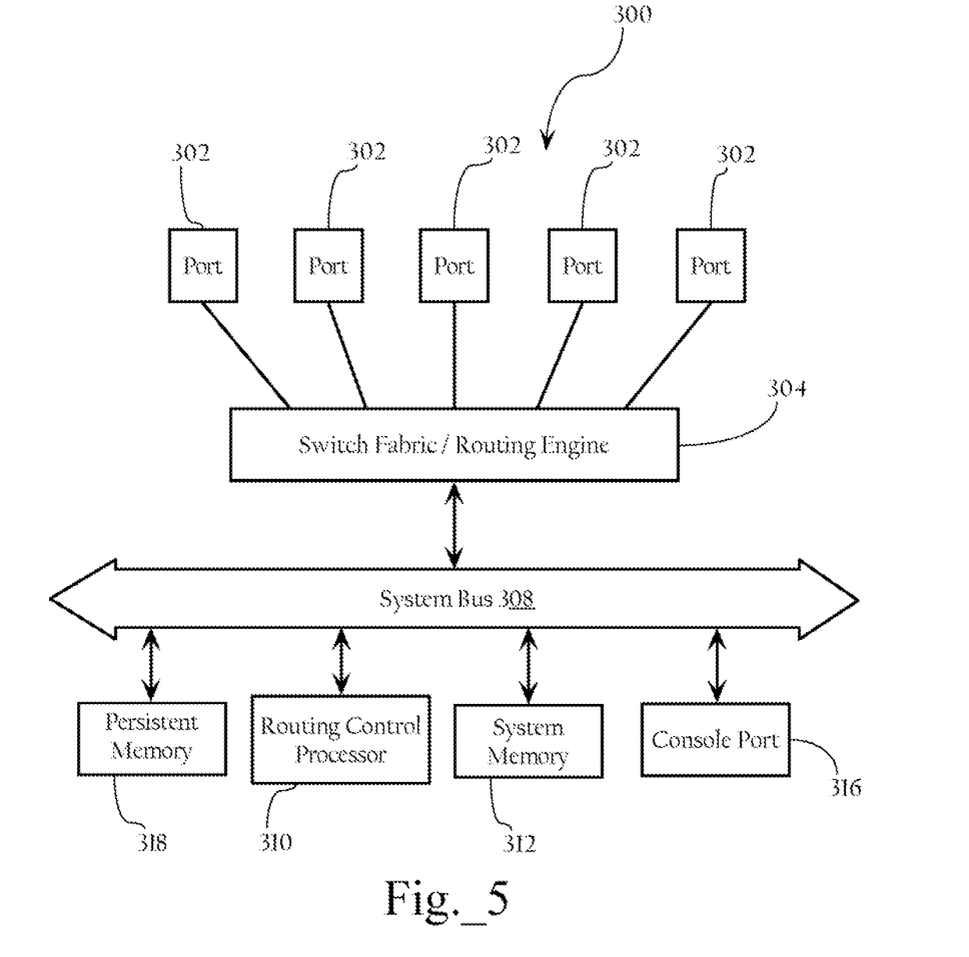
FIG. 5 is a schematic diagram illustrating an example system architecture of a router.

Border routers 29a-d exchange network reachability information using a Border Gateway Protocol (BGP) or other routing protocol suitable to the network environment. The Border Gateway Protocol (BGP) is the core routing protocol of the Internet. Border routers 29a-29d maintain one or more tables of IP networks or 'prefixes' which designate network reachability among autonomous systems (AS). FIG. 5 illustrates an example system architecture 300 of a border router 29a-d. In one implementation, the system architecture 300 includes a routing processor 310, system memory 312, persistent memory 318 (e.g., flash memory or a hard disk drive), a routing engine/switch fabric 304 connected to a plurality of ports 302, a system bus 308 interconnecting these components, and one more software or firmware modules (loadable into system memory 312) directed to network routing functions (e.g., switch fabric and routing table/engine configuration, control message processing, BGP/IGP processing, and the like). Other functional modules may include discovery modules operative to discover the identity and capabilities of neighboring network devices. In one implementation, one or more of the ports 302 may be Ethernet interfaces. The system architecture 300 may optionally include a console port 316 allowing for administrative access for purposes such as configuration and diagnostics.

Figure 2:
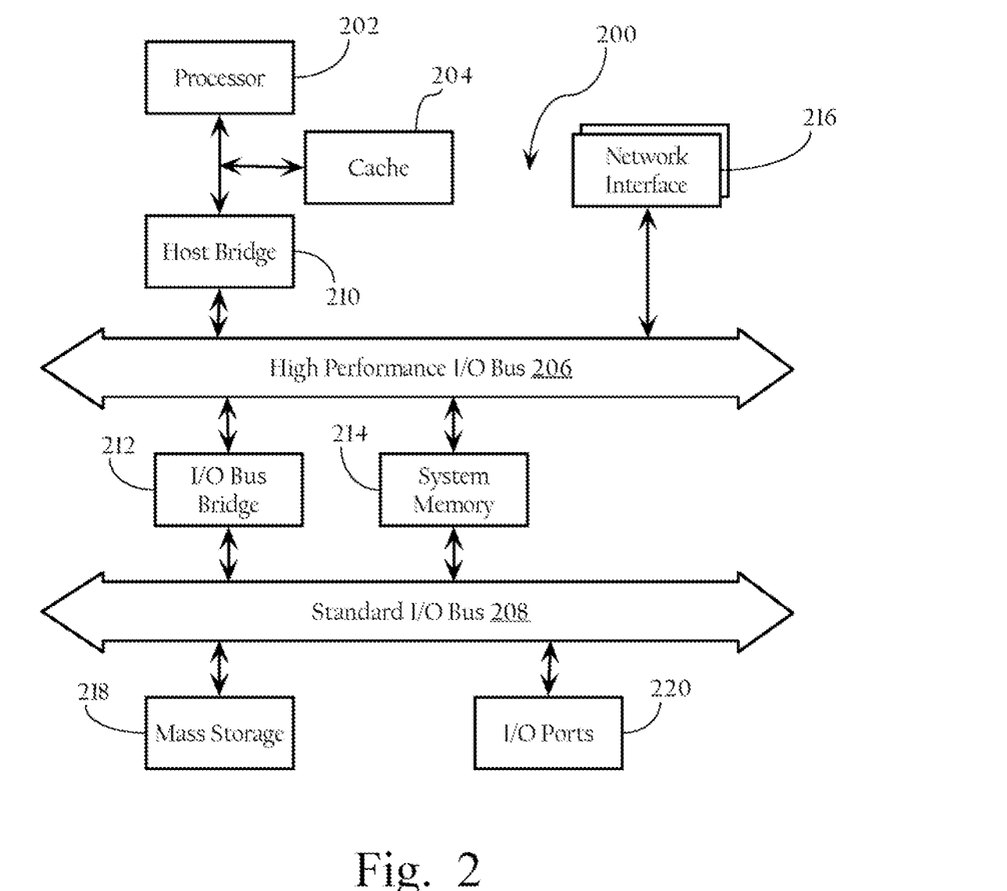
FIG. 2 is a schematic diagram illustrating elements of an example peer system architecture.

FIG. 2 illustrates an example hardware system architecture 200 of a peer node. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the peer node described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Apple Macintosh Operating System, available from Apple Computer Inc. of Cupertino, Calif., UNIX operating systems, Windows® 95/98/NT/XP/Vista operating systems, and the like.

B. 1. Anycast Addresses for Peer Discovery

In particular implementations, the de-centralized bootstrapping mechanism utilizes an allocated set of anycast addresses from the public IP space. This set of anycast addresses can be allocated from an available unicast address netblock assigned by the Internet Assigned Numbers Authority (IANA) or any other source of IP address allocations. Alternatively, IP addresses may be taken from those already allocated to a network that is participating in the P2P system. Alternatively, if the IP network cloud 22 illustrated in FIG. 1 is not the Internet, but any other IP network, the anycast addresses can be any addresses that are valid within that IP network. The set of anycast addresses is known to all peers in the P2P network. They can be known through any number of means, including but not limited to hard coding into the software routines of the peer, through configuration files, and through manual or automatic configuration. When a peer is added to the P2P network 30, the newly added peer attempts to discover one or more existing peer nodes by transmitting discovery messages using one or more of the anycast addresses from the allocated set.

Anycast is a network addressing and routing scheme whereby datagrams are routed to the "nearest" or "best" destination host as viewed by the routing topology. In anycast, there is a one-to-many association between network addresses and network endpoints—that is, each destination anycast address corresponds to a set of receiver endpoints, but only one of them is chosen at any given time to receive packets from any given sender. Anycast can be implemented by using BGP to simultaneously announce the same destination IP address range or specific host route from many different places on the Internet. This results in packets addressed to destination addresses in this range, or corresponding to the host route, being routed to the "nearest" host on the network announcing the given destination IP address. Anycast is normally highly reliable, as it can provide automatic failover.

How anycast routes are injected into routing tables can vary. In a particular implementation, a routing process running directly on the peer can inject and remove anycast address netblocks from the network routing tables. This enables the peer to automatically control whether it is available. It also allows the network to automatically age out routes, which may happen if a peer fails. In an alternate implementation, the border router advertises a route to the anycast address or address block. It performs this advertisement as long as the peer node is available within the network. To know this, it monitors the availability of the P2P node. This can be done by an external "heartbeat" monitoring of the hosts function, and withdraw the route announcement if the host fails. In some cases this is done by the actual hosts announcing the anycast prefix to the router over Open Shortest Path First (OSPF), or another Internal Gateway Protocol (IGP), protocol. If the host fails, the router will automatically withdraw the announcement.

Figure 3A:
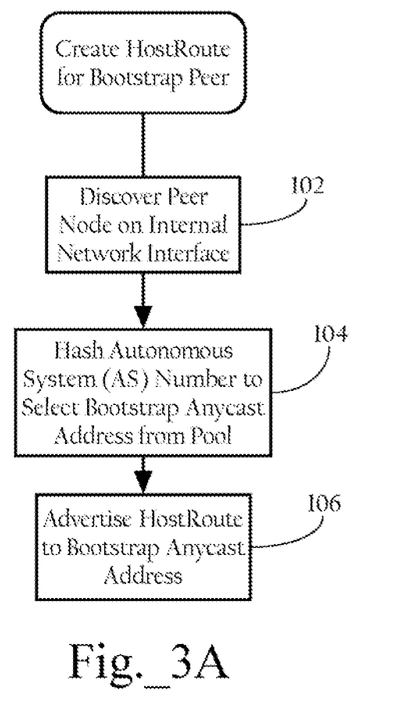
FIG. 3 is a flow diagram illustrating an example method for creating and advertising a host route to a peer node in a peer-to-peer network.
Figure 3B:
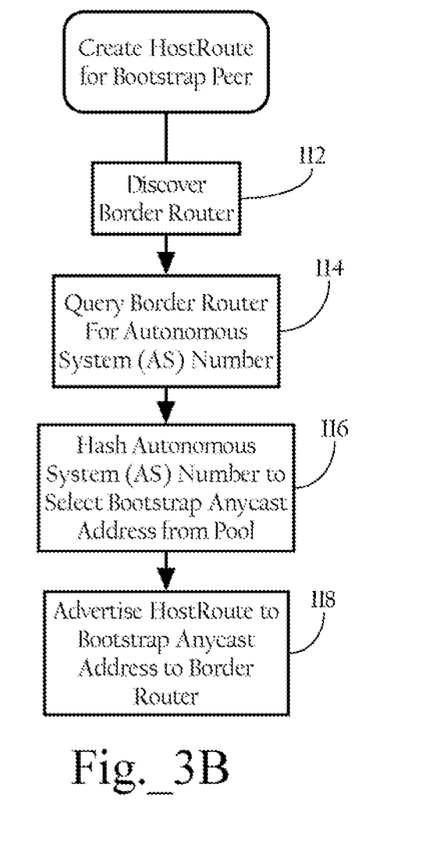

FIGS. 3A and 3B illustrate alternative methods for selecting and advertising anycast addresses for peer nodes. A border router, such as router 29a, may implement the process illustrated in FIG. 3A. As discussed above, border router 29a may include discovery functionality that discovers the identity and capabilities of peers connected to network 20a. Border router 29a can be configured, as part of this discovery process, to monitor for peer nodes or other hosts of a defined service or network device type (such as P2P VoIP gateway) (102), Responsive to discovery of such a host, border router 29a may select an anycast address from the allocated set by hashing the AS number corresponding to network 20a and mapping the hashed value, or a portion of the hashed value, to one of the anycast numbers in the allocated set (104). In one implementation, the border router 29a may compute a hash using any suitable strong or weak hashing algorithm and using one or more attributes of the hashed value to map into an anycast address of the allocated set. For example, the least significant bits of the hashed value required to express the number of anycast addresses in the allocated set can be used to select the anycast address. A variety of other selection methodologies can be used. For example, an anycast address can just be selected at random. In addition, other identifiers or values than AS number can be hashed, such as the IF address of the peer node, a random number, or combinations of the foregoing. After selection, the border router 29a advertises the selected anycast address as a host, route using BGF or other routing protocol (106). In some implementations, the border router 29a may also perform network address translation on incoming discovery messages and outgoing responses, translating the anycast address to the actual network address of the peer node 24a, and vice versa. Alternatively, the border router 29a may tunnel incoming packets to the peer node, encapsulating incoming discovery messages with an IP header containing the actual network address of the peer node 24a and sending them through the tunnel. Any suitable tunneling mechanism can be used, including IP-in-IP, GEE, IPSec VPN, SSL VPN, and so on.

In alternative implementations, anycast address selection and host route advertising can be executed by the peer node 24a. For example, as FIG. 3B illustrates, the peer node 24a may discover border router 29a (112) and query the border router 29a for its AS number (114). The peer node 24a may then compute the hash of the AS number, as discussed above, to select an anycast address from the allocated set (116). Alternatively, the peer node may just select, an anycast address at random, or pick one based on a configuration. In some implementations, this can be done without communication with the border router. In other implementations, it can be done by communicating with the border router. The peer node 24a advertises the selected anycast address to the border router 29a as a/32 or host route using the routing protocol running in network 20a. In such an implementation, the peer node 24a can be configured with a modified network protocol stack operative to accept messages addressed with the anycast network address or a local IF address within the subnet range corresponding to network 20a. In another implementation, border router 29a can be configured to perform network address translation or encapsulation, as discussed above, to forward the discovery messages to the peer node 24a.

In any of the foregoing implementations, this network layer reachability information of the bootstrapping service hosted by the peer nodes propagates to other routing nodes in the IP network. In this manner, discovery messages transmitted by newly added peers may be routed to peers in the P2P network implementing an anycast bootstrap application service. Furthermore, the use of anycast addresses generally provides that the discovery messages are routed to the topologically nearest peer node in the P2P network. An additional technical advantage is that the bootstrapping operations are fully distributed amongst the nodes in the mesh. Still further, allocating a sufficient number of anycast addresses (such as twenty unique addresses) ensures redundancy. Furthermore, using a hash of the AS number or other string, or any other suitable random selection process, provides load balancing of the bootstrapping 'work' across all domains with AS numbers.

B.2. Initialization and Bootstrapping of Peer Nodes in P2P Network

Figure 4:
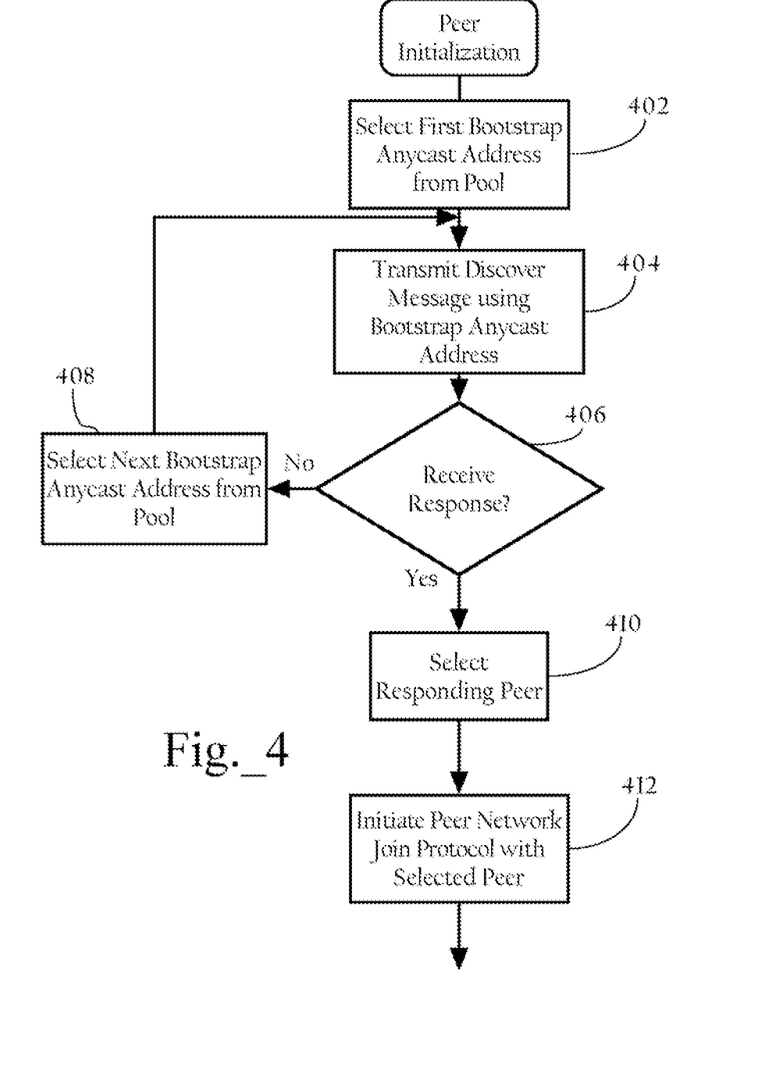
FIG. 4 is a flow diagram illustrating an example process for initializing a peer node in a peer-to-peer network.

FIG. 4 illustrates a process flow that a peer node may execute as part of its initialization process in joining a P2P network. For didactic purposes, assume that peer node 24c has been newly added to the P2P network 30. Peer node 24c has also been configured with the set (or a subset) of the allocated anycast addresses discussed above. Upon initialization, peer node 24c selects a first anycast address from the pool (402) and transmits one or more discovery messages using the selected anycast address (404). The discovery message may be a single datagram using a. connectionless transport layer protocol, such as the User Datagram Protocol (UDP). As FIG. 4 illustrates, peer node cycles through the pool of anycast addresses until it receives one or more responses (404, 406, 408). As discussed above, the discovery message may be routed to an existing peer node (such as peer node 24a) in the P2P network 30. The response may include the actual network address of the responding peer in the payload of the message. The peer node 24c may then select a responding peer (if more than one response was received) (410), and initiate a join protocol session with the selected peer to join the P2P network. For example, in the implementation shown, peer node 24c may be provided with the network addresses of other peers (such as peer nodes 24b & 24d) to enable the exchange of VoIP call routing information. Other implementations are possible. For example, the response to the discovery message may include a network address of another peer node (e.g., peer node 24b) or a supernode in the P2P network 30. The details of the join protocol, as well as mechanisms for exchanging and/or synchronizing information between peers, are beyond the scope of the disclosure.

"Logic" may refer to hardware, software, other logic, or any suitable combination of the preceding that may be used to provide information or instructions. Certain logic may manage the operation of a device, and may comprise, for example, a processor. "Processor" may refer to any suitable logic operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Head Only Memory (ROM), a magnetic drive, a disk drive, a Compact Disk (CD) drive, a Digital Video Disk (DVD) drive, removable media storage, any other suitable data storage medium, or a combination of any of the preceding.

The present invention has been explained with reference to specific embodiments. For example, while embodiments of the present invention have been described, as operating in connection with P2P networks used for VoIP call routing information, the present invention can be used in connection with any suitable P2P network. Other embodiments will be evident to those of ordinary skill in the art. It is therefore not intended that the present invention be limited, except as indicated by the appended claims.

What is claimed is:

1. A method comprising
    discovering, by a peer node in a peer-to-peer network, a border router operably connected to a packet communications network;
    selecting, by the peer node, a bootstrap anycast address from an allocated set of bootstrap anycast addresses, the allocated set of bootstrap anycast addresses including addresses used by other peer nodes in the peer-to-peer network;
    advertising, by the peer node, network layer reachability information to the border router, wherein the network layer reachability information includes the selected bootstrap anycast address;
    receiving, by the peer node, a message from a host forwarded by the border router; and
    transmitting, by the peer node, a response to the message, wherein the response includes a network address of the peer node;
    querying, by the peer node, the border router for an autonomous system number of the border router; and
    following the reception of the autonomous system number from the border router, hashing, by the peer node, the autonomous system number, wherein selecting the bootstrap anycast address is based on one or more attributes of the hashed autonomous system number.

2. The method of claim 1, further comprising mapping the one or more attributes of the hashed autonomous system number to one of the bootstrap anycast addresses in the allocated set of bootstrap anycast addresses in order to select the bootstrap anycast address.

3. The method of claim 1, further comprising mapping the hashed autonomous system number to one of the bootstrap anycast addresses in the allocated set of bootstrap anycast addresses in order to select the bootstrap anycast address.

4. The method of claim 1, further comprising mapping a portion of the hashed autonomous system number to one of the bootstrap anycast addresses in the allocated set of bootstrap anycast addresses in order to select the bootstrap anycast address.

5. Logic encoded in one or more non-transitory tangible media for execution and when executed, by a processor of a peer node in a peer-to-peer network, configured to:
    discover a border router operably connected to a packet communications network;
    select a bootstrap anycast address from an allocated set of bootstrap anycast addresses, the allocated set of bootstrap anycast addresses including addresses used by other peer nodes in the peer-to-peer network;
    advertise network layer reachability information to the border router, wherein the network layer reachability information includes the selected bootstrap anycast address;
    receive a message from a host forwarded by the border router; and
    transmit a response to the message, wherein the response includes a network address of the peer node;
    query the border router for an autonomous system number of the border router; and
    following the reception of the autonomous system number from the border router, hash the autonomous system number, wherein selecting the bootstrap anycast address is based on one or more attributes of the hashed autonomous system number.

6. The logic of claim 5, wherein the logic is further configured to map the one or more attributes of the hashed autonomous system number to one of the bootstrap anycast addresses in the allocated set of bootstrap anycast addresses in order to select the bootstrap anycast address.

7. The logic of claim 5, wherein the logic is further configured to map the hashed autonomous system number to one of the bootstrap anycast addresses in the allocated set of bootstrap anycast addresses in order to select the bootstrap anycast address.

8. The logic of claim 5, wherein the logic is further configured to map a portion of the hashed autonomous system number to one of the bootstrap anycast addresses in the allocated set of bootstrap anycast addresses in order to select the bootstrap anycast address.

9. A system, comprising:
    a memory configured to store one or more instructions; and
    a processor of a peer node in a peer-to-peer network, configured, upon executing the one or more instructions, to:
        discover a border router operably connected to a packet communications network;
        select a bootstrap anycast address from an allocated set of bootstrap anycast addresses, the allocated set of bootstrap anycast addresses including addresses used by other peer nodes in the peer-to-peer network;
        advertise network layer reachability information to the border router, wherein the network layer reachability information includes the selected bootstrap anycast address;
        receive a message from a host forwarded by the border router;
        transmit a response to the message, wherein the response includes a network address of the peer node;
        query the border router for an autonomous system number of the border router; and
        following the reception of the autonomous system number from the border router, hash the autonomous system number, wherein selecting the bootstrap anycast address is based on one or more attributes of the hashed autonomous system number.

10. The system of claim 9, wherein the processor is further configured, upon executing the one or more instructions, to map the one or more attributes of the hashed autonomous system number to one of the bootstrap anycast addresses in the allocated set of bootstrap anycast addresses in order to select the bootstrap anycast address.

11. The system of claim 9, wherein the processor is further configured, upon executing the one or more instructions, to map the hashed autonomous system number to one of the bootstrap anycast addresses in the allocated set of bootstrap anycast addresses in order to select the bootstrap anycast address.

12. The system of claim 9, wherein the processor is further configured, upon executing the one or more instructions, to map a portion of the hashed autonomous system number to one of the bootstrap anycast addresses in the allocated set of bootstrap anycast addresses in order to select the bootstrap anycast address.

* * * * *